P. MAY.
COMBINED SWEEPER AND RAKE.
APPLICATION FILED FEB. 27, 1911.
1,014,404.
Patented Jan. 9, 1912.
2 SHEETS—SHEET 1.
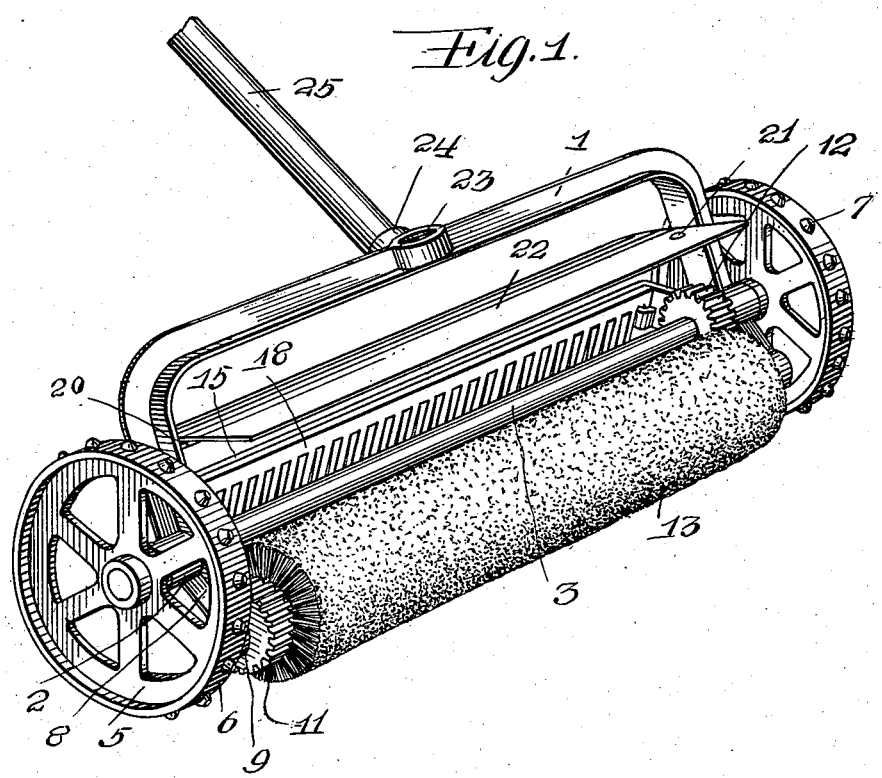
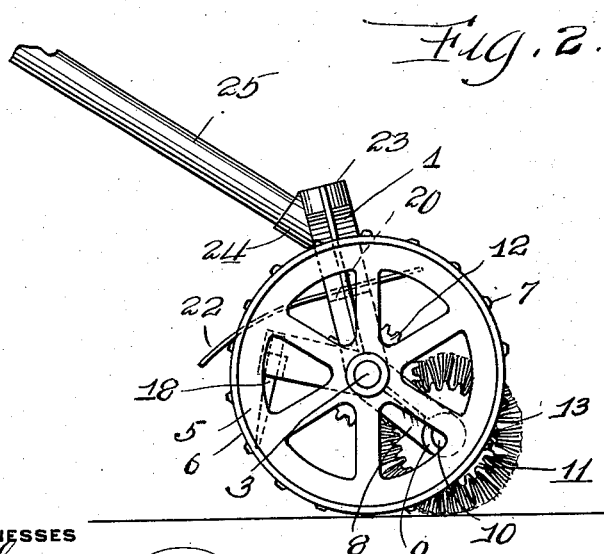

P. MAY.
COMBINED SWEEPER AND RAKE.
APPLICATION FILED FEB. 27, 1911.
1,014,404.
Patented Jan. 9, 1912.
2 SHEETS—SHEET 2.
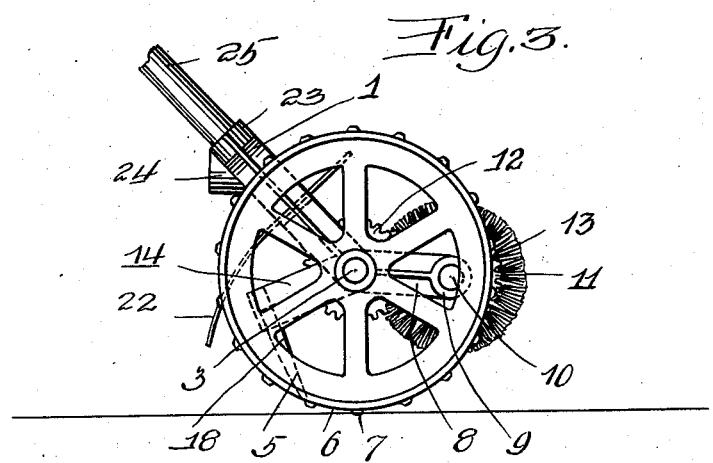
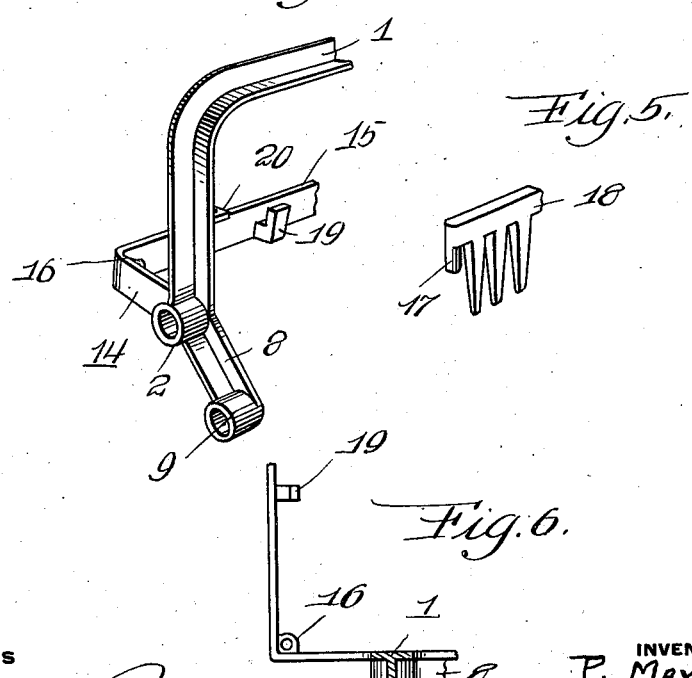
WITNESSES
INVENTOR
P. MAY.

UNITED STATES PATENT OFFICE.

PHILOMENA MAY, OF PITTSBURGH, PENNSYLVANIA.

COMBINED SWEEPER AND RAKE.

1,014,404.  Specification of Letters Patent.  Patented Jan. 9, 1912.

Application filed February 27, 1911. Serial No. 611,198.

*To all whom it may concern:*

Be it known that I, PHILOMENA MAY, a citizen of the United States of America, residing at Pittsburgh, in the county of Allegheny and State of Pennsylvania, have invented certain new and useful Improvements in Combined Sweepers and Rakes, of which the following is a specification, reference being had therein to the accompanying drawing.

This invention relates to a combined sweeper and rake, and the primary object of the invention is to combine a rotary sweeper and rake that can be advantageously used for sweeping pavements, floors and other surfaces and raking a lawn or yard.

A further object of the invention is to provide an implement of the above type that is simple in construction, durable, inexpensive to manufacture and highly efficient for the purposes for which it is intended.

With the above and other objects in view, the invention resides in the novel construction, combination and arrangement of parts to be hereinafter specifically described and then claimed.

Reference will now be had to the drawings, wherein:—

Figure 1 is a perspective view of the implement, Fig. 2 is a side elevation of the same, as a sweeper, Fig. 3 is a similar view as a rake, Fig. 4 is a perspective of the main frame, Fig. 5 is a perspective view of a detached rake, and Fig. 6 is a plan of a portion of the main frame.

The reference numeral 1 denotes a bail or inverted U-shaped frame, T-shaped in cross section, and the ends of this frame are provided with bearings 2 for a revoluble axle 3. Mounted upon the outer ends of the axle 3 are wheels 5 having the treads 6 thereof provided with anti-skidding devices, as prongs 7 adapted to engage in a surface and prevent the wheels from slipping when the implement is in operation. The lower ends of the frame 1 are provided with forwardly extending arms 8 having bearings 9 for a shaft 10, and mounted upon this shaft at the ends thereof are gear wheels 11 meshing with gear wheels 12 upon the revoluble shaft 3. The shaft 10 supports a cylindrical brush 13 constituting a sweeper for cleansing a pavement or other surface. The ends of the frame 1 support the ends 14 of a rake supporting bar 15, said bar having the ends thereof provided with sockets 16 for depending pins 17, carried by the ends of the rake 18. The rake intermediate the ends thereof is supported by brackets 19 carried by the front side of the bar 15. The inner sides of the frame 1 are provided with apertured lugs 20 and connected to these lugs by screws 21 or other fastening means is a curved shield or deflector 22 extending rearwardly over the rake supporting bar 15.

The frame 1 intermediate the ends thereof is provided with two sockets 23 and 24, the latter being disposed at an angle to the frame, and detachably mounted in one of said sockets and capable of being transferred to the other of said sockets is the lower end of a handle rod 25.

With the handle rod 25 in the socket 24, the implement can be used as a sweeper, the rake 18 being elevated and the brush 13 retained in engagement with the surface over which the implement is moved. As the implement is moved forwardly the brush 13 is revolved through the medium of the shafts 3 and 10 and the gear wheels 11 and 12. When the handle rod 25 is transferred to the socket 23, the frame 1 is lowered sufficiently to place the rake in proximity to the surface over which the implement is moved, and the rotary brush 13 is elevated. The shield or deflector 22 prevents dirt and other matter from being thrown rearwardly by the brush, also sticks or other large pieces of matter from passing over the top of the rake.

It is thought that the operation and utility of the implement will be apparent without further description, and while in the drawings there is illustrated a preferred embodiment of the invention, it is to be understood that the structural elements thereof are susceptible to such changes as fall within the scope of the appended claims.

What I claim is:—

1. In combination, an axle, a frame mounted on the axle and provided on one side with bearings for a rotary brush and on the other side with a rake carrying bar, a handle associated with said frame, means to vary the position of said handle to lower the brush or the rake into operative position, and supporting wheels carried by said axle.

2. In combination, a revoluble axle, supporting wheels fixed thereto, a bail in the ends of which the axle is mounted, forwardly and rearwardly extending arms fixed to the ends of said bail, one pair carrying a rotary brush geared to the axle, and the other a rake bar, a handle adjustable on said bail to lower either set of arms to operative position, and a shield carried by the bail intermediate the handle and the brush and rake.

3. In combination, a revoluble axle, supporting wheels fixed thereto, a bail in the ends of which the axle is mounted, pairs of arms fixed to the ends of said bail and extending substantially radially from said axle, one pair carrying a rotary brush geared to the axle, the other pair being connected by a bar carrying rake supporting means, and a handle adjustable on said bail to lower either set of arms to operative position.

In testimony whereof I affix my signature in the presence of two witnesses.

PHILOMENA MAY.

Witnesses:
 H. L. HEGNER,
 MAX H. SROLOVITZ.

Copies of this patent may be obtained for five cents each, by addressing the "Commissioner of Patents, Washington, D. C."